United States Patent
Yamashita et al.

(10) Patent No.: US 7,486,409 B2
(45) Date of Patent: Feb. 3, 2009

(54) DISPLACEMENT SENSOR

(75) Inventors: Yoshihiro Yamashita, Fukuchiyama (JP); Hirotaka Nakashima, Fukuchiyama (JP); Masahiro Kawachi, Kyotanabe (JP)

(73) Assignee: Omron Corporation, Kyoto-shi (JP)

( * ) Notice: Subject to any disclaimer, the term of this patent is extended or adjusted under 35 U.S.C. 154(b) by 0 days.

(21) Appl. No.: 11/586,002

(22) Filed: Oct. 25, 2006

(65) Prior Publication Data

US 2007/0103701 A1     May 10, 2007

(30) Foreign Application Priority Data

Oct. 28, 2005 (JP) ............................ 2005-313968

(51) Int. Cl.
*G01B 11/14* (2006.01)
(52) U.S. Cl. ...................................... 356/624; 356/614
(58) Field of Classification Search ................. 356/614, 356/624
See application file for complete search history.

(56) References Cited

U.S. PATENT DOCUMENTS 5,130,735 A * 7/1992 Kusaka et al. ............... 396/104

FOREIGN PATENT DOCUMENTS

| CN | 88 2 11094 | 8/1988 |
|---|---|---|
| JP | 07-113617 | 5/1995 |
| JP | 2003-272209 | 9/2003 |
| JP | 2004-102228 | 4/2004 |
| JP | 04102228 A1 * | 4/2004 |
| JP | 2005-195338 | 7/2005 |

* cited by examiner

*Primary Examiner*—L. G. Lauchman
*Assistant Examiner*—Iyabo S Alli
(74) *Attorney, Agent, or Firm*—Foley & Lardner LLP (57) ABSTRACT

In a sensor head, parallel rays or approximately parallel rays are generated by a pair of condenser lenses that reciprocate according to vibrations of a collimate lens and a tuning fork, and go out from a light port. To the light port, a lens holder in which an objective lens is supported is detachably attached. The light from the light port is processed to measurement beams that are condensed by the objective lens to a predetermined position.

9 Claims, 9 Drawing Sheets

DISPLACEMENT SENSOR

BACKGROUND OF THE INVENTION

This application claims priority from Japanese patent application 2005-313968, filed Oct. 28, 2005. The entire content of the aforementioned application is incorporated herein by reference.

1. Field of the Invention

The present invention relates to a displacement sensor including a projector, a photoreceiver including an aperture, and a lens unit including a lens reciprocatable along an optical axis of a coaxial optical system (called a coaxial confocal optical system) adjusted so that a light emission position of the projector and the aperture have a conjugate relation. The displacement sensor measures a displacement of an object to be measured on the basis of the position of the lens when a light reception amount signal of the photoreceiver displays a maximum value.

2. Description of the Related Art

A displacement sensor of this kind uses the principle that when light emitted from a projector via a lens unit condenses in a predetermined position, light reflected at the condense point travels in a path opposite to the projection path and condenses in the position of an aperture having a conjugate relation with the light emission position. Concretely, the displacement sensor emits a measurement beam that condenses in a predetermined position while reciprocating a predetermined lens in the lens unit along the optical axis, receives reflection light of the beam, and obtains a displacement of an object to be measured (hereinbelow, called a work) on the basis of the position of the lens when the light reception amount signal of the photoreceiver has the maximum value.

An example of the document disclosing the optical system and the principle of measuring process is Japanese Patent Application Laid-Open No. Hei 7-113617.

Figure 8:
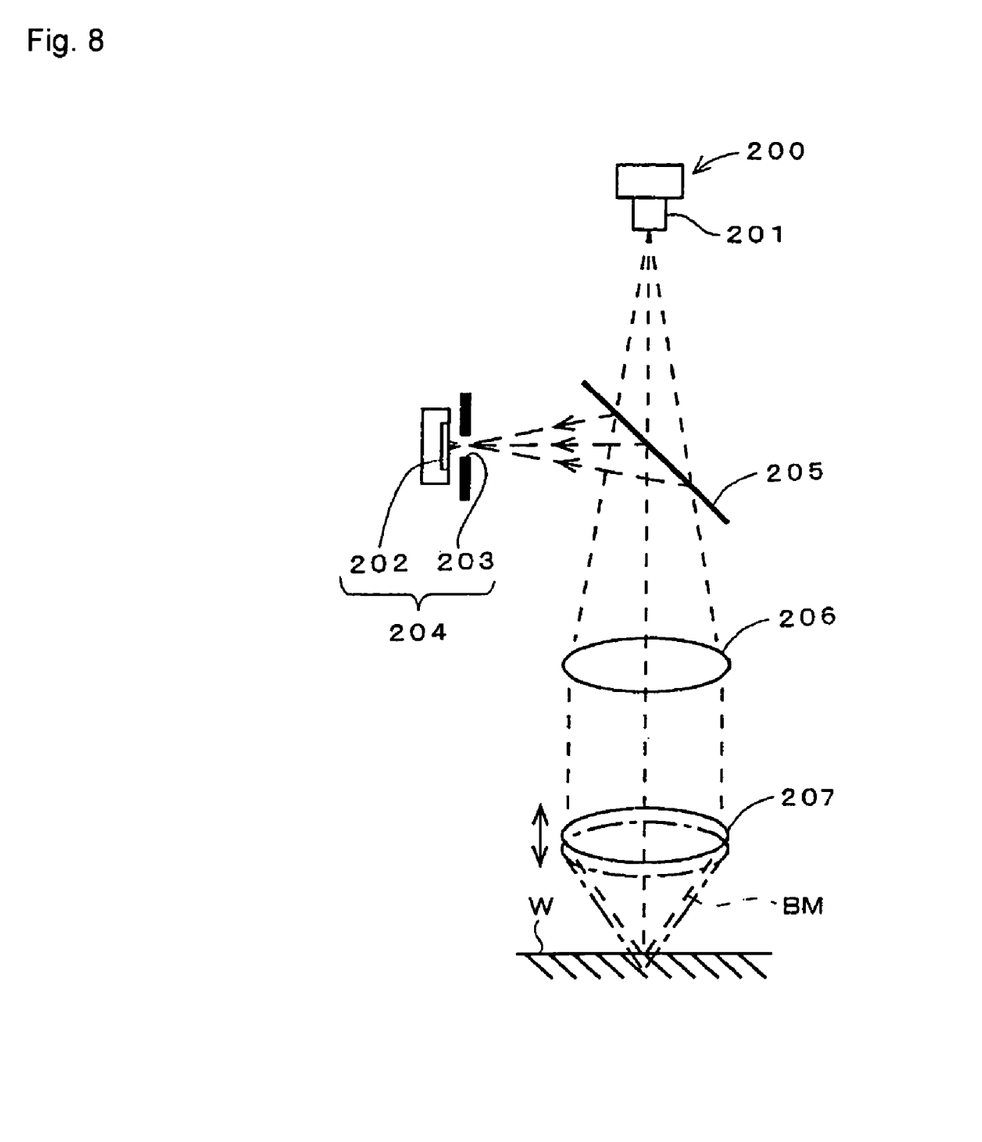
FIG. 8 shows the configuration of a coaxial confocal optical system in a conventional displacement sensor.

FIG. 8 shows the configuration of an optical system of a displacement sensor disclosed in Japanese Patent Application Laid-open No. Hei 7-113617. The optical system includes a projector 200 having a laser diode 201, a photoreceiver 204 including a photodiode 202 and a pin hole 203, a beam splitter 205, and a pair of lenses 206 and 207. In the lenses, the lens 206 closer to the projector and the photoreceiver is a collimate lens, and the other lens 207 is an objective lens.

The objective lens 207 is attached to the tip of a not-shown tuning fork and reciprocates along the optical axis in accordance with vibration of the tuning fork. When the laser diode 201 is allowed to emit light in this state, a beam condensing position of a measurement beam BM passed through the lenses 206 and 207 also changes. Therefore, when the beam condensing position of the measurement beam BM and the position of the surface of a work W coincide, reflection light from the work W converges at the pin hole 203, so that the light reception amount signal of the photodiode 202 increases. On the other hand, the phenomenon does not occur in the other cases, so that light is hardly incident on the photodiode 202. Therefore, based on the position of the objective lens 207 when the light reception amount signal has the maximum value, the beam condensing position of the measurement beam BM at the time point is obtained, and is set as the position of the work W.

Since the displacement sensor of this kind is used for applications of measuring a small displacement on a work such as an electrode pattern on a glass substrate, the optical system has to be adjusted so that a condensing range of a beam in the optical axis direction is limited to an extremely narrow range (in other words, the depth of focus becomes shallow).

On the other hand, the height of a reference face of the work and the magnitude of the displacement fluctuate according to the kinds of works. Consequently, there is a demand for freely changing a working distance of a sensor (the minimum distance between the light emission face of the sensor and the measurement beam condensing position) and a measuring range (range in which the condensing position of the optical beam moves).

One of methods addressing the demand is replacement of the objective lens. However, when the weight and diameter of the lens is changed, resonance frequency also changes. Consequently, the lens driving system has to be re-designed. Therefore, the demand is not addressed only by replacing the lens, and it is difficult to carry out the method.

As described in Japanese Patent Application Laid-Open No. 2004-102228, there is another method of disposing a divergent lens between an objective lens and a collimate lens and adjusting the beam condensing position by making the divergent lens reciprocate. According to the method, however, light entering the objective lens does not become parallel light. Consequently, it is difficult to narrow the beam to the condensing position, and a problem occurs such that measurement accuracy cannot be assured. In addition, since the divergent lens reciprocates, at the time of replacing the divergence lens for adjustment of the beam condensing position, a problem similar to that in the case of replacing the objective lens occurs.

Further, the displacement sensor of this kind is often used for in-line measurement in a factory or the like. During the measurement, a work is often changed. However, a lens in the sensor and a driving system cannot be replaced unless measurement is stopped for long time. It is also difficult for the user in the site to execute the replacement, so that it is difficult to employ the method in the site of performing in-line measurement.

On the other hand, when the beam condensing position is changed by adding a conversion lens to the coaxial confocal optical system, it is unnecessary to change the design of the sensor body, and it seems that the method also allows in-line measurement.

Figure 9:
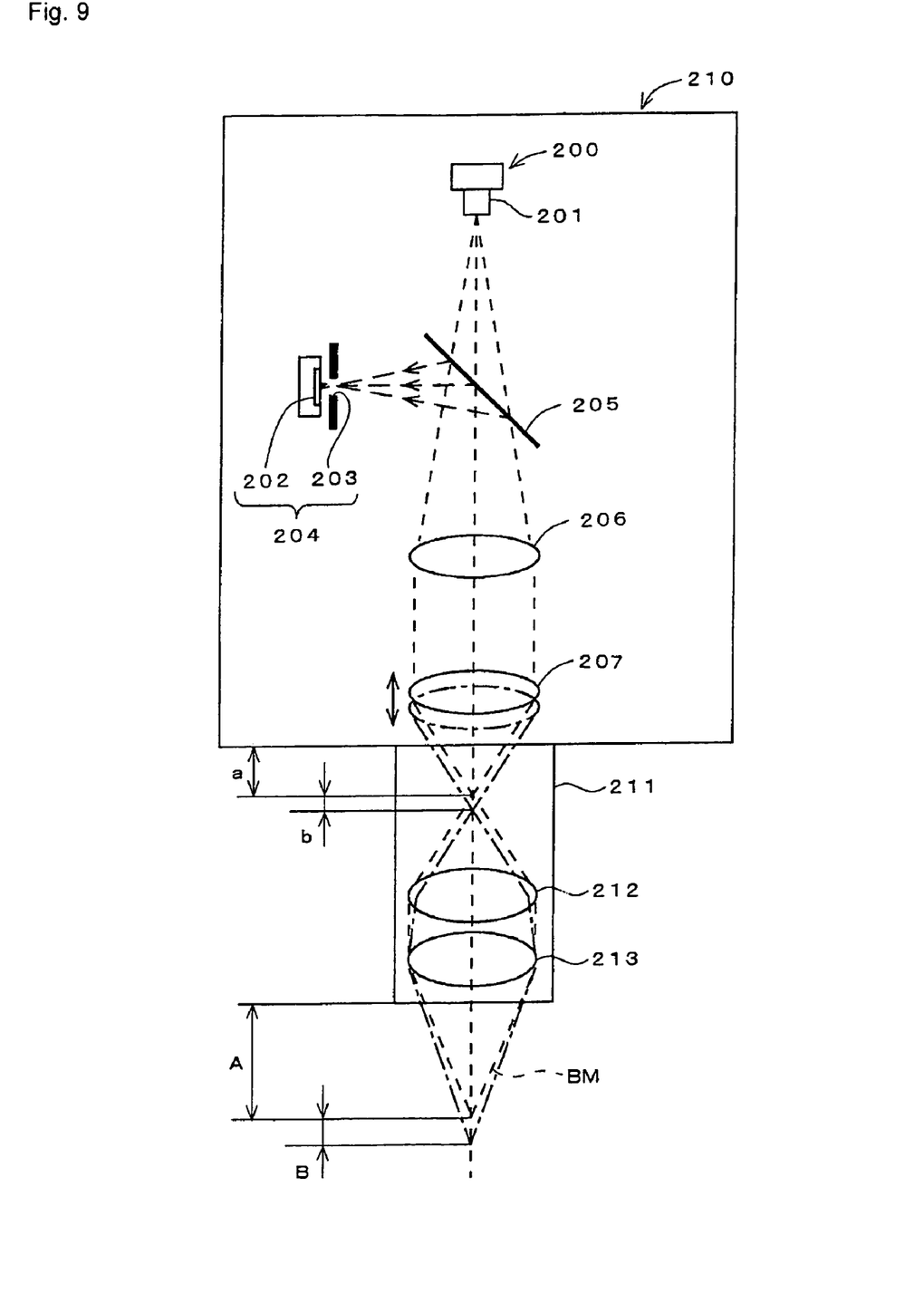
FIG. 9 shows an example in which a lens is added to the sensor head in the optical system of FIG. 8.
Figure 10:
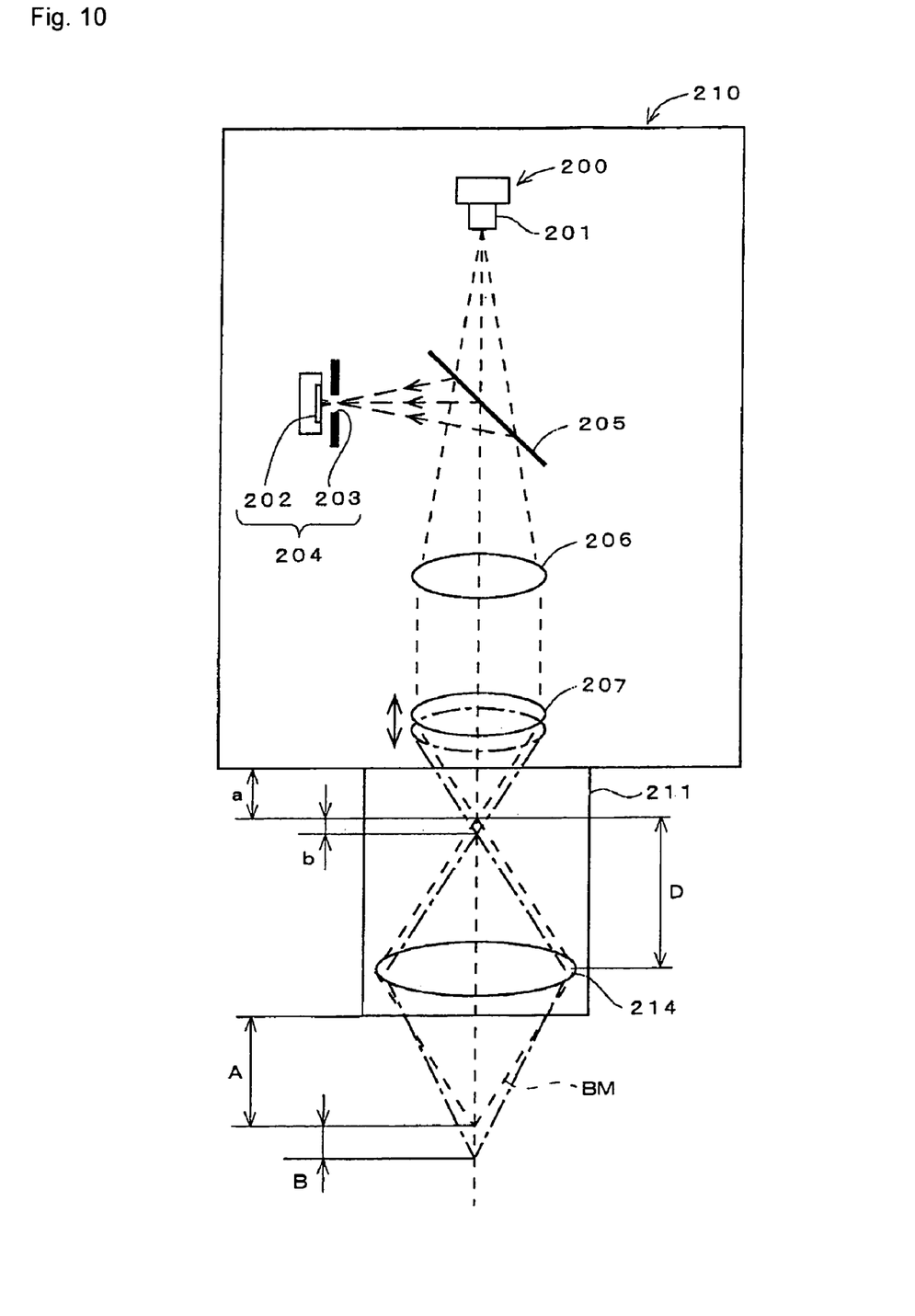
FIG. 10 shows an example in which a lens is added to the sensor head in the optical system of FIG. 8.

FIGS. 9 and 10 show an example of changing a working distance and a measuring range by attaching a lens holder 211 in which a conversion lens is assembled to a sensor head 210 in which the optical system of FIG. 8 is assembled. In the example of FIG. 9, a collimate lens 212 and a condenser lens 213 are assembled in the lens holder 211 to convert light condensed by the optical system in the sensor head 210 to once parallel rays and the parallel rays are condensed again. In an example of FIG. 10, light condensed and then expanded is again condensed by a single condenser lens 214.

In each of the diagrams, "a" and "b" show the working distance and the measuring range of the original optical system, and A and B express the working distance and the measuring range after the change.

As described above, theoretically, the working distance and the measuring range can be changed by adding a lens. However, when the direction of light once condensed is changed, light becomes susceptible to the influence of aberration of the lens and the like. As a result, the condensing range at the time of re-condensing the light cannot be sufficiently narrowed, and accuracy of measurement cannot be assured.

In the examples of FIGS. 9 and 10, the light condensed by the original optical system and expanded is incident on the lenses 212, 213, and 214 for correction. Consequently, when the height of the lenses 212, 213, and 214 for correction is changed, the working distance and the measuring range also fluctuate. In such a configuration, when the position of the lens holder 211 is adjusted in accordance with the height of the work W, measurement parameters also change, and a problem occurs such that adjustment cannot be performed easily.

In addition, in the method of FIG. 10, to condense diverging rays, the lens 214 having a large diameter is necessary, and it is necessary to set a distance D from the light condensing position by the original optical system to the lens 214 to be longer than the focal distance of the lens 214. It also causes a problem of increase in the size of the lens holder 211.

The present invention has been achieved by paying attention to the problems, and an object of the invention is to enable a working distance and a measuring range to be easily changed by adding a lens holder with a simple configuration and to assure measurement accuracy also after the change.

SUMMARY OF THE INVENTION

A displacement sensor according to the invention includes a projector, a photoreceiver including an aperture, and a lens unit including a lens reciprocatable along an optical axis of a coaxial optical system adjusted so that a light emission position of the projector and the aperture have a conjugate relation, and measures a displacement of an object to be measured on the basis of the position of the lens when a light reception amount signal of the photoreceiver displays a maximum value. In a casing enclosing the coaxial optical system, a light port is formed in a position opposite to a lens face of a lens at the final stage in the lens unit, in a casing enclosing the coaxial optical system. A lens holder in which an objective lens is supported is detachably disposed in the light port. The lens unit converts light from the projector into parallel rays and leads the parallel rays to the light port at a predetermined time point during the reciprocatable lens reciprocates once.

When the light reception amount signal has a maximum value, it means that a signal obtained in correspondence with the state that the light reception amount is the maximum displays a maximum value. Depending on the polarity of a signal, the negative maximum value, that is, the minimum value is also included.

With the configuration, light emitted from the light port in the casing is condensed by an external objective lens to a predetermined position. At a time point when light emitted from the light port becomes a parallel rays, the light after passing the objective lens can be narrowed to a limited range. When the fluctuation width of the reciprocating lens is small, it is considered that light close to parallel rays (hereinbelow, called "approximately parallel rays") can be generated at times other than the time point the parallel rays are obtained. Similarly, the light from the objective lens can be narrowed to a limited range. Therefore, by using the narrowed light, high-accuracy measurement can be performed.

The lens unit may include one or a plurality of lenses. Lenses of an arbitrary number may be set to be reciprocative. The number of lens holders is not limited to one. A plurality of kinds of lens holders in which focal lengths of objective lenses are different may be produced, and a lens holder according to a purpose may be selected and attached to the light port.

In a preferred embodiment of the displacement sensor, a position in the optical axis direction of the lens holder or of the objective lens in the holder is changeable. In the mode, the position of the objective lens can be adjusted according to the height of a work. As long as parallel rays or approximately parallel rays are emitted from the light port, even if the distance from the light port to the objective lens changes, the width of light incident on the objective lens hardly changes. Therefore, the working distance and the measuring range using the objective lens as a reference also hardly change, so that the position of the objective lens or lens holder can be easily determined. Thus, a displacement sensor having high usability can be provided.

In another preferred embodiment of the displacement sensor, the lens unit converts light from the projector to parallel rays when the reciprocatable lens reaches a reference position in which the reciprocatable lens is to be positioned in a stationary state. In this case, high-accuracy measuring process can be performed by using a light reception amount signal obtained at the time point when the lens reaches the reference position, in a predetermined period around the time point, and a period in which approximately parallel rays enter the lens holder.

In a further another preferable embodiment of the displacement sensor, measuring means for measuring a distance to the object to be measured by using a light reception amount signal obtained by the photoreceiver during travel of the parallel rays or approximately parallel rays from the lens unit is provided. The measuring means may be provided in the casing enclosing the coaxial optical system or constructed as a device separately from the casing.

According to the invention, with the simple configuration, the light condensing position can be easily adjusted according to the kind or the like of a work and, moreover, by limiting a light condensing range to an extremely narrow range, measurement accuracy can be assured. Therefore, a display sensor having high performance and high usability can be provided.

DETAILED DESCRIPTION OF THE PREFERRED EMBODIMENTS

Figure 1:
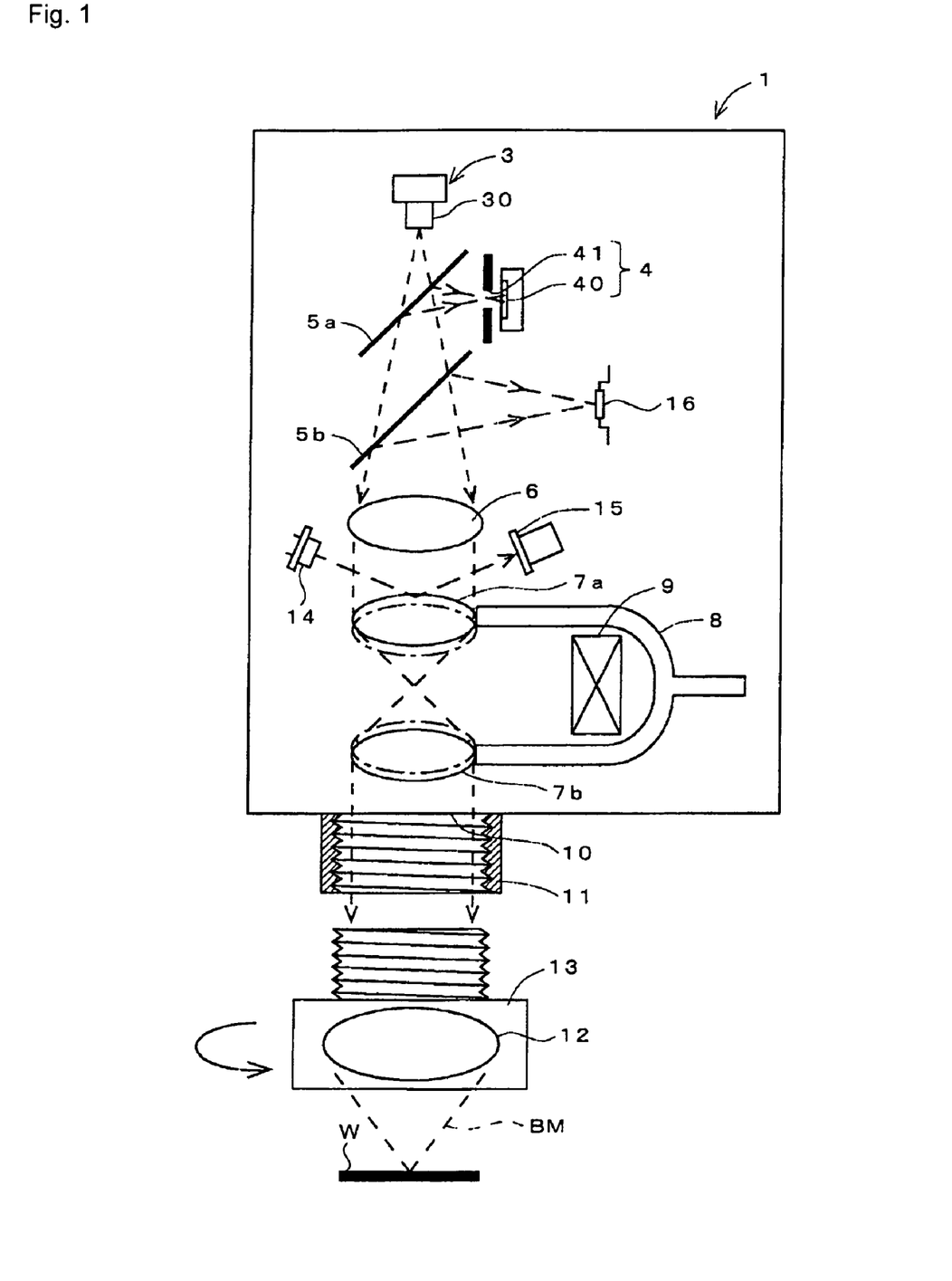
FIG. 1 shows an optical system of a sensor head to which the present invention is applied.

FIG. 1 shows a configuration example of a sensor head 1 of a displacement sensor to which the present invention is applied.

The sensor head 1 scans the surface of a work W with a measurement beam BM, receives reflection light of the measurement beam BM from the work W, and generates a light reception amount signal necessary to measure a displacement of the surface of the work W. The generated light reception amount signal is fetched by a controller 2 which will be described later, and a process for measuring a displacement of the work W is executed.

The sensor head 1 of the embodiment is provided with a projector 3 using a laser diode 30, a photoreceiver 4 including a photodiode 40 and a pin hole 41, and a coaxial confocal optical system including half mirrors 5a and 5b and three lenses 6, 7a, and 7b. Further, in the sensor head 1, a light port 10 for the optical system is formed. In the light port 10, a cylindrical body 11 having a screw therein is continuously formed, and a lens holder 13 enclosing an objective lens 12 is detachably attached to the cylindrical body 11.

The laser diode 30 of the projector 3 is disposed so that its optical axis extends toward the light port 10 (in the diagram, in the vertical direction). The photoreceiver 4 is provided coaxially with the projector 3 via the half mirror 5a and is disposed so that the light emission face of the laser diode 30 and the pin hole 41 have a conjugate relation.

The lens 6 closest to the projector 3 and the photoreceiver 4 among the three lenses 6, 7a, and 7b is a collimate lens, and the remaining two lenses 7a and 7b are condenser lenses having the same focal distance. The condenser lenses 7a and 7b are integrally attached to the tips of a tuning fork 8. The focal point of each of the condenser lenses 7a and 7b coincides with the center line of the tuning fork.

A coil 9 for driving is disposed near the tuning fork 8. By repeating a period of passing current to the coil 9 and a period of stopping the supply of current in predetermined cycles, the tuning fork 8 vibrates. The condenser lenses 7a and 7b move so as to approach each other and be apart from each other in accordance with the vibrations of the tuning fork 8.

The sensor head 1 has therein an LED 14 and a PSD 15 for detecting the position of the condenser lens 7a on the upper side. For the purpose of generating an image in the measurement region, a CCD 16 having a predetermined number of pixels is provided. Reflection light from the light port 10 is led to the CCD 16 via the half mirror 5b, and an image showing contrast is generated.

In the above configuration, light from the laser diode 30 is led to the collimate lens 6 via the half mirrors 5a and 5b and is transformed to parallel rays. Further, the parallel rays are condensed once by the condenser lens 7a and converted again to parallel rays by the other condenser lens 7b, and the parallel rays go out from the light port 10.

The objective lens 12 in the lens holder 13 receives the parallel rays from the light port 10, and the measurement beam BM condensed to a predetermined position is generated. To condense light to the limited range, an ideal condition is to make the parallel rays incident. It is therefore considered that expansion in the optical axis direction of the measurement beam BM in the embodiment is condensed to an extremely narrow range. When rays incident on the objective lens 12 are parallel rays, the working distance and the measuring range using the lens 12 as a reference are unchanged regardless of the position of the objective lens 12. Consequently, the flexibility of the height of the objective lens 12 increases, and it facilitates adjustment of the light condensing position. Since the working distance and the measuring range can be adjusted only by the external lens holder 13, it is unnecessary to change the configuration of the sensor head 1 and the controller 2. An average user can set desired measurement parameters by easily performing an adjusting work.

Figure 2:
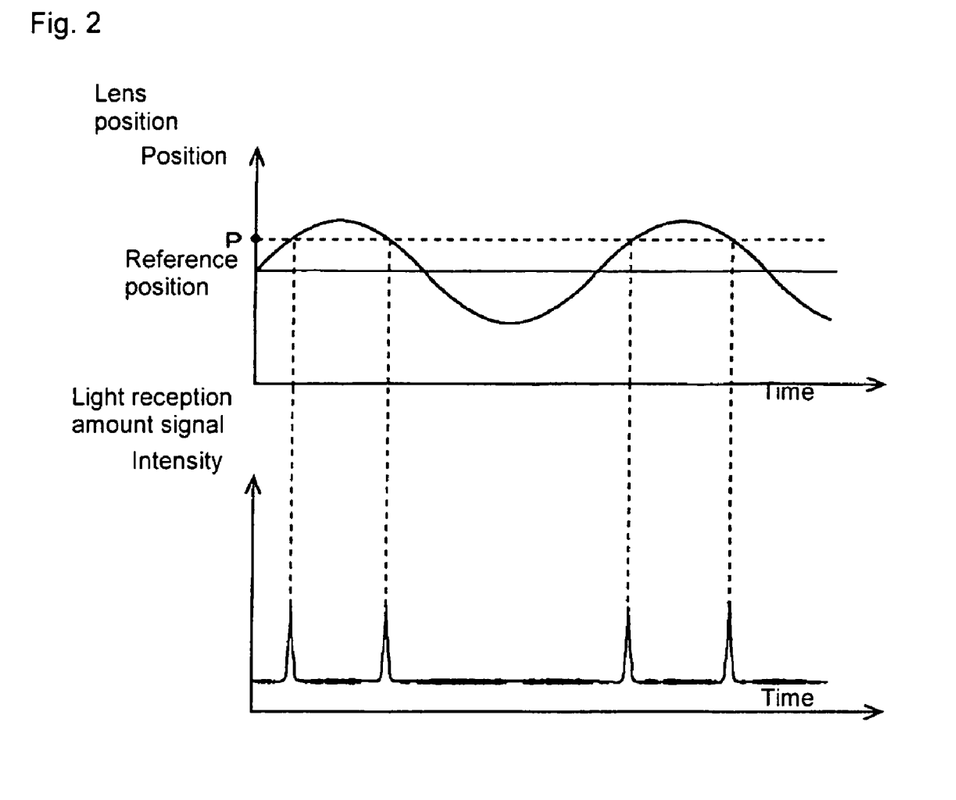
FIG. 2 shows the relation between a lens position signal and a light reception amount signal.

FIG. 2 shows the relation between a signal indicative of the position of the condenser lens 7a (hereinbelow, called "lens position signal") detected by the PSD 15 and a light reception amount signal obtained by the photodiode 40.

The PSD 15 receives reflection light of light emitted from the LED 14 to the condenser lens 7a and outputs a signal indicative of the incident position. The signal is fetched by a signal processing circuit 18 which will be described later, and the position of the condenser lens 7a is obtained on the basis of the principle of triangulation. The signals are arranged in time series, thereby obtaining a lens position signal in FIG. 2. Since the condenser lens 7a moves according to the vibration of the tuning fork 8, the lens position signal is a signal which changes in a sine wave shape around the position when the tuning fork 8 is stopped (hereinbelow, called "reference position") as a center.

When the surface of the work W coincides with the condense position of the measurement beam BM, the measurement beam BM reflected by the work W travels along a path opposite to a light projection path and condenses in the position of the laser diode 30 and the pin hole 41. A maximum value (peak) appears in the light reception amount signal at this time.

In the example of FIG. 2, when the condenser lens is in a predetermined position P, a peak appears in the light reception amount signal. It means that the surface of the work W is positioned in the position of the focal point of the measurement beam BM when the condenser lens is disposed in the position P. Therefore, in the embodiment, a conversion table indicative of the relation between a distance from the objective lens 12 to the condensing position of the measurement beam BM and the lens position signal is preliminarily obtained. By using the conversion table, a distance corresponding to the position of the condenser lens 7a when a peak appears in the light reception amount signal is obtained. The distance is recognized as a distance from the objective lens 12 to the surface of the work W (hereinbelow, the distance will be called "detection distance").

Figure 3:
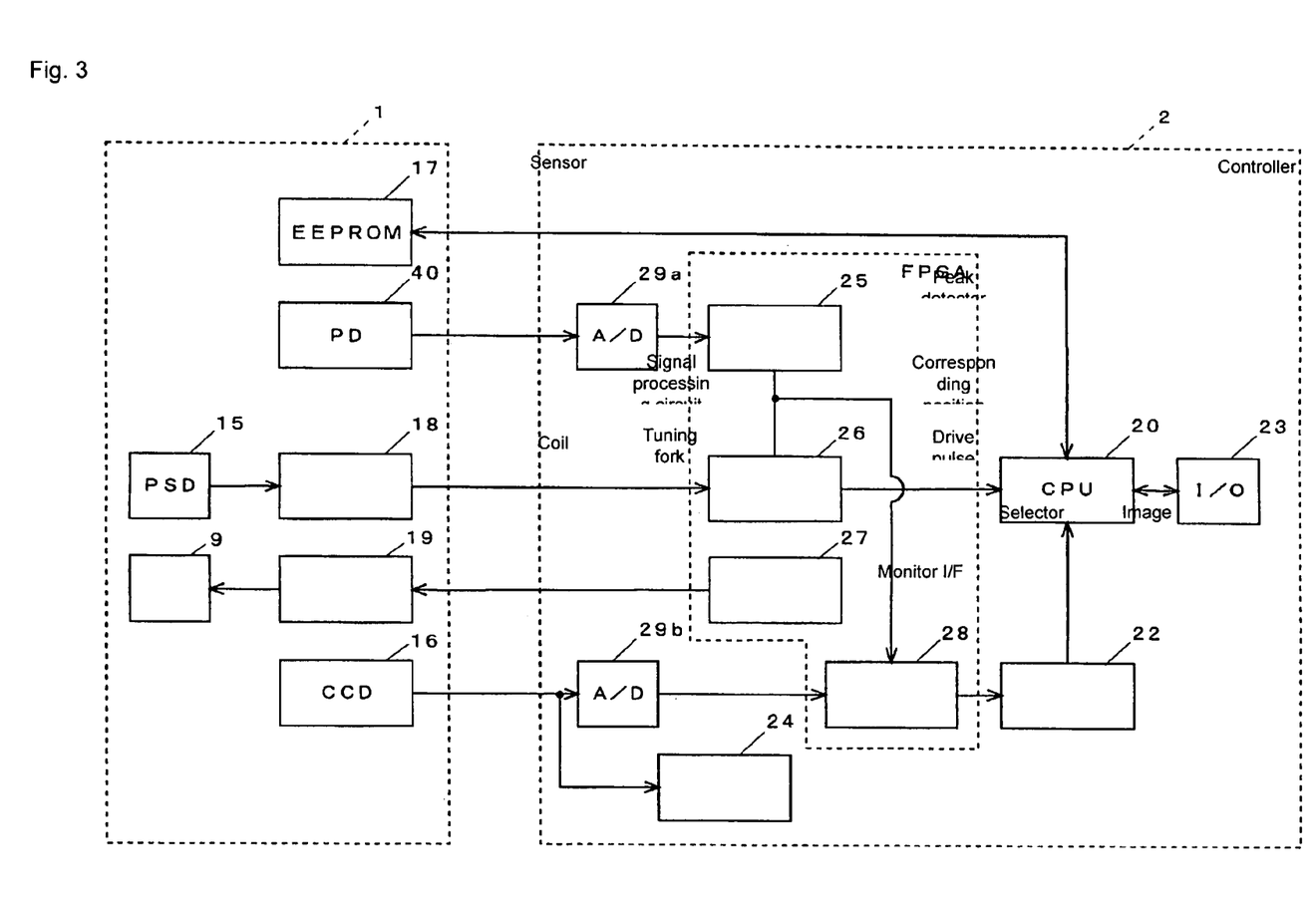
FIG. 3 shows a block diagram of a displacement sensor.

FIG. 3 is a block diagram showing an electric configuration of the sensor head 1 and the controller 2.

In the sensor head 1, in addition to the optical system, an EEPROM 17, the signal processing circuit 18, a tuning fork driving circuit 19, a driving circuit (not shown) of the laser diode 30, and the like are assembled. In the controller 2, A/D converters 29a and 29b for signals from a photodiode 40 and a CCD 16 on the sensor head 1 side, a CPU 20, an image memory 22, an input/output interface 23, a monitor interface 24, an FPGA (Field Programmable Gate Array) 21, and the like are assembled.

The FPGA 21 performs operation control on the sensor head 1 and signal processing, and includes a peak detector 25, a corresponding position detector 26, a drive pulse generator 27, and a selector 28.

The drive pulse generator 27 generates a drive pulse having predetermined cycles and supplies it to the tuning fork driving circuit 19 in the sensor head 1. The tuning fork driving circuit 19 supplies current to the coil 9. By passing current on and off in cycles according to the drive pulse, the tuning fork 8 is made vibrate in predetermined cycles.

The signal processing circuit 18 in the sensor head 1 samples signals from the PSD 15 every predetermined sampling time, measures the position of the condenser lens 7a, and outputs a measurement value. The output measurement value is supplied to the corresponding position detector 26 in the controller 2.

The light reception amount signal of the photodiode ("PD" in FIG. 3) 40 is supplied to the controller 2 and converted to a digital signal by the A/D converter 29, and the digital signal is supplied to the peak detector 25. The peak detector 25 detects the maximum value of the light reception amount signal by a differential process or the like and, when the maximum value is detected, outputs a detection signal. The detection signal is supplied to the corresponding position detector 26 and the selector 28.

The corresponding position detector 26 samples and holds the value of a lens position signal on reception of the detection signal, and outputs the value to the CPU 20.

The EEPROM 17 in the sensor head 1 is connected to the CPU 20. When the sample-and-hold value is received from the corresponding position detector 26, the CPU 20 refers to the conversion table in the EEPROM 17 on the basis of the received value, and extracts, as a detection distance, a distance (expressed in the unit of mm in the embodiment) corresponding to the sample-and-hold value. Further, the CPU 20 computes the difference between the extracted detection distance and a detection distance extracted immediately before the extracted detection distance. When the difference is larger than a predetermined threshold, it is determined that a displacement occurs in the surface of the work W and that the difference between the detection distances is the magnitude of the displacement. The result of the determination of the presence/absence of the displacement and the size of the displacement part is output to a not-shown external device via the input/output interface 23.

An image signal from the CCD 16 is supplied to the A/D converter 29*b* and the monitor interface 24. Further, the image signal subjected to A/D conversion is supplied to the selector 28. The selector 28 outputs image data received for a predetermined period elapsed since the detection signal is received from the peak detector 25 to the image memory 22. As a result, an image generated when the beam for measurement from the sensor head 1 coincides with the surface of the work W is stored in the image memory 22. By connecting a monitor to the monitor interface 24, an image of the area to be measured of the sensor head 1 can be always displayed.

In the sensor head 1, a plurality of objective lenses 12 with different focal distances can be assembled. In this case, conversion tables are set for the respective objective lenses 12 in the EEPROM 17, and the CPU 20 selects the table corresponding to the objective lens 12 being used from the conversion tables, and executes a process for obtaining the detection distance.

The optical system shown in FIG. 1 is set so that, when the tuning fork 8 is stopped, the focal points of the condenser lenses 7*a* and 7*b* coincide with the center axis of the tuning fork 8. Therefore, at the time point the lenses 7*a* and 7*b* reach the reference positions, perfect parallel rays can be emitted toward the light port 10. However, when the condenser lenses 7*a* and 7*b* are deviated from the reference positions and the focal points shift, the rays to the light port 10 do not become perfect parallel rays.

Since the movement range of the lenses 7*a* and 7*b* is extremely small, a shift of the focal points between the lenses 7*a* and 7*b* is not so large, and it can be considered that rays that may be regarded as approximately parallel with each other can be generated. Therefore, parallel rays or approximately parallel rays are always emitted from the light port 10 of the sensor head 1, so that the measurement beam BM that converges in the limited range can be emitted from the objective lens 12, and a small displacement on the work W can be extracted with high accuracy.

In the case where more strict measurement accuracy is requested, measurement may be carried out only when the condenser lenses 7*a* and 7*b* are in the reference positions and only in the period in which the shift amount of the focal points of the lenses 7*a* and 7*b* lies within a predetermined value.

Next, in the case where the displacement sensor of this kind is used for in-line measurement, as a rule, the sensor head 1 is disposed in a predetermined height position, the works W are sequentially loaded to the measurement region, and measurement process on the works W being moved is performed. Since the reference height varies according to the kinds of the works W, in some cases, the height of the sensor head 1 has to be adjusted so that the surface of the work W is included in the measurement range of the sensor head 1.

However, the support of the sensor head 1 is constructed hard for stabilization, so that it is difficult to change the height.

On the other hand, as shown in FIGS. 9 and 10, although there is a method of extending the focal point position of the measurement beam BM by an external lens, as described above, the light condense range is widened in the configuration, and a problem occurs such that the measurement accuracy cannot be assured.

On the other hand, the optical system shown in FIG. 1 can easily address the problem by adjusting the position of the objective lens 12 in accordance with the height of the work W.

Figure 4:
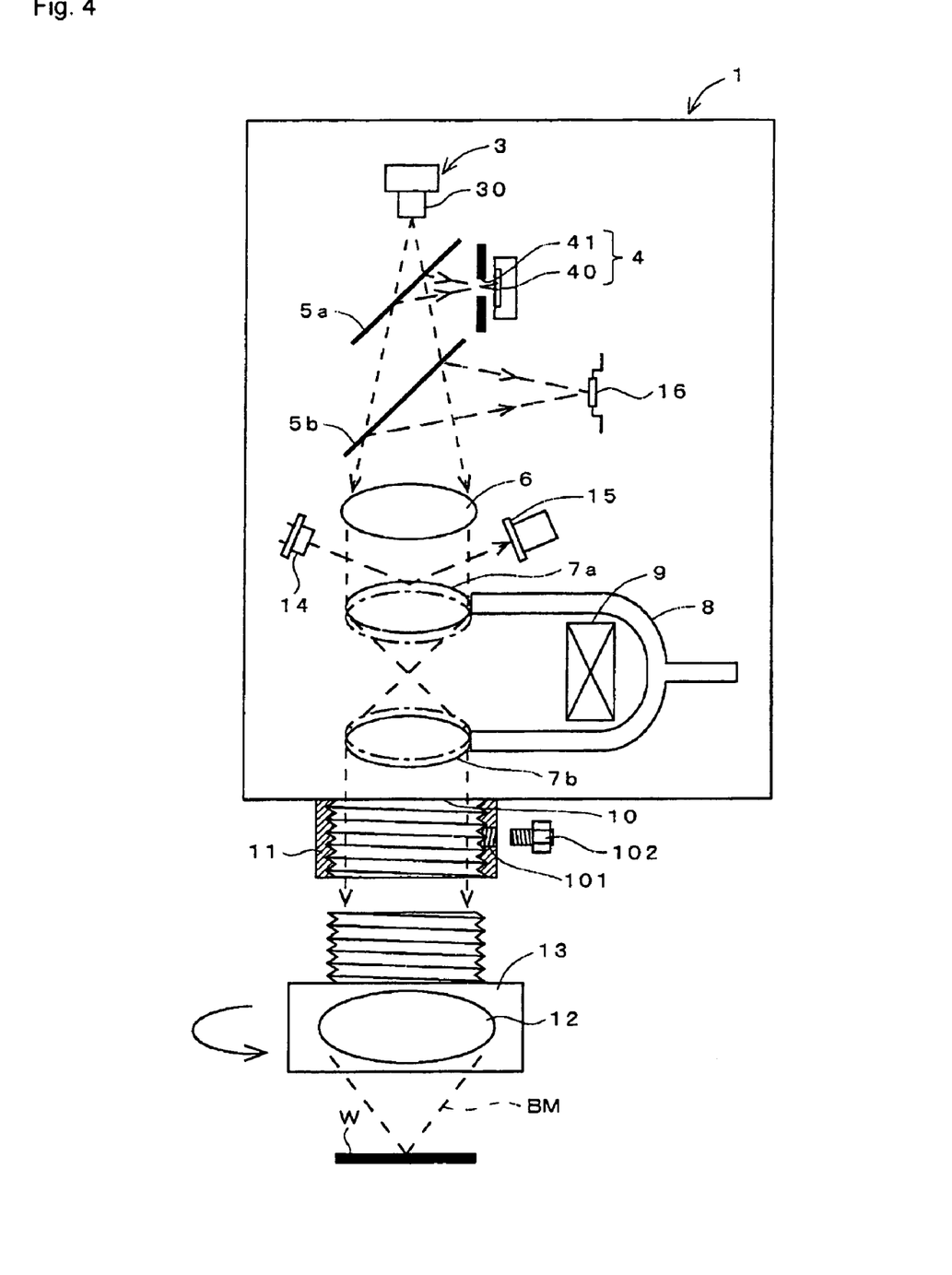
FIG. 4 shows an example in which the position of a lens holder can be adjusted.

FIG. 4 shows an example in which the attaching position of the lens holder 13 in the sensor head 1 can be finely adjusted. In this example and an example of FIG. 5, the main configuration is similar to that of FIG. 1. The same reference numerals are given to the same components as those in FIG. 1, and their description will not be repeated.

In the example of FIG. 4, a screw hole 101 is formed in the cylindrical body 11 communicated with the light port 10 in the sensor head 1. By a screw 102 inserted in the screw hole 101, the lens holder 13 can be fixed at an arbitrary height position. With the configuration, after the height position of the lens holder 13 with respect to the cylindrical body 11 is adjusted so that the surface of the work W is included in the measurement range of the sensor head 1, the lens holder 13 can be fixed to the adjusted position. Consequently, without changing the height of the sensor head 1, the optical system can deal with any height of the work W. Since the width of light incident on the objective lens 12 hardly changes even when the position of the lens holder 13 is adjusted, the range in which the measurement beam BM is condensed does not expand and accuracy of measurement can be stabilized.

Further, it is considered that the working distance and the measuring range using the objective lens 12 as reference hardly change. Consequently, as long as the same objective lens 12 is used, the detection distance can be obtained by using the same conversion table irrespective of the height of installation of the objective lens 12. Therefore, it is sufficient to adjust the position of the lens holder 13 only in consideration of adjustment of the working distance and the measuring range to the work W. Thus, the adjusting work is extremely easy.

The configuration of adjusting the height of the objective lens 12 is not limited to the above configuration. For example, a configuration may be employed in which the length of the lens holder 13 can be variably set and the height of the objective lens 12 may be changed by adjusting the length.

Figure 5:
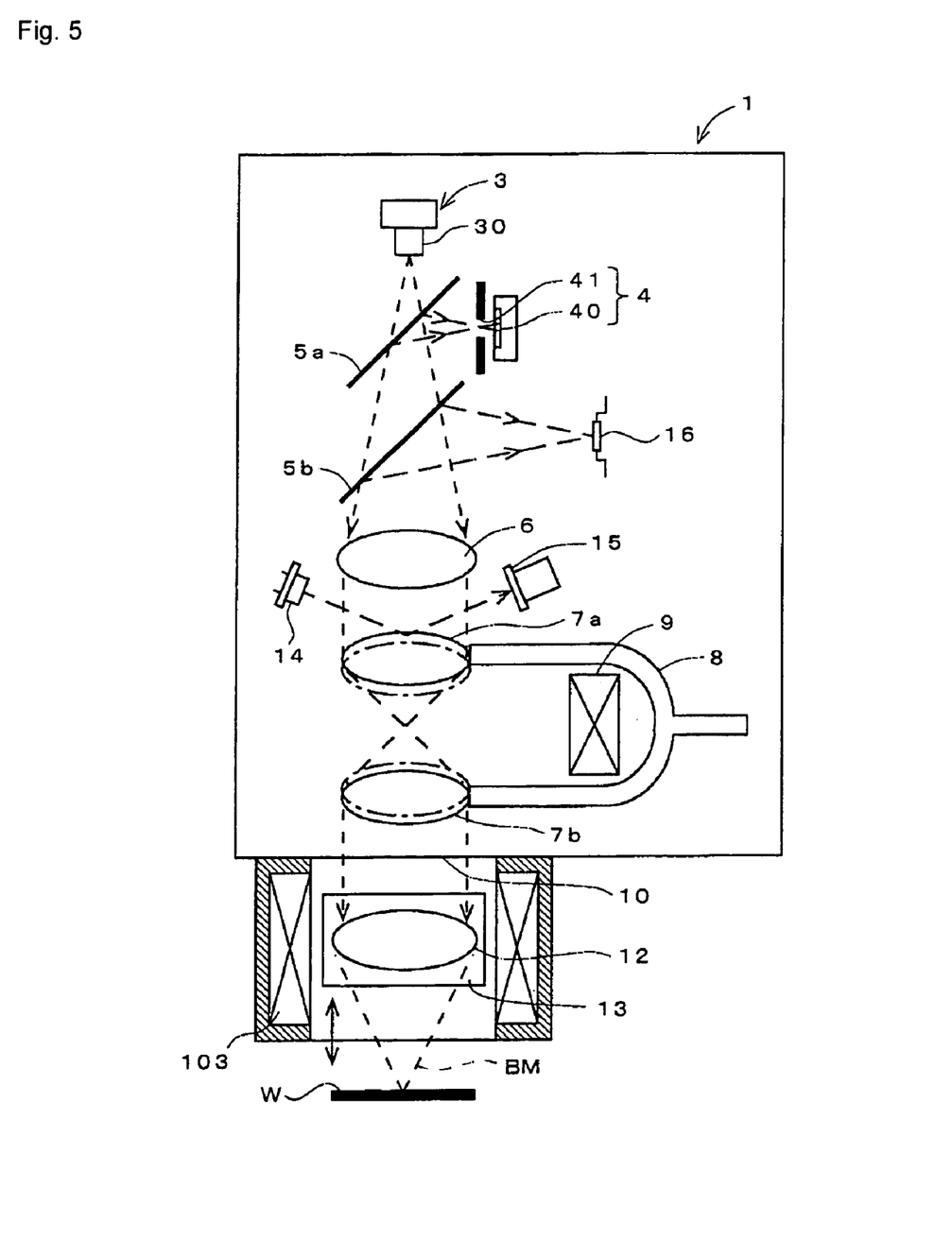
FIG. 5 shows an example in which the lens holder can be moved in the vertical direction during measurement.

FIG. 5 shows a configuration example in which the position of the objective lens 12 can be adjusted according to variations in the height of the surface of the work W during measurement of the work W.

The surface of the work W is not formed perfectly uniform although it seems flat to the naked eye. On the other hand, to detect a small displacement, there is tendency that the measuring range is set small. Consequently, there is the possibility a measurement error occurs in a case such that the work W fluctuates in the vertical direction with respect to the measurement range during measurement, and a part of displacement to be detected lies out of the measurement range. In the example of FIG. 5, a vertically moving mechanism 103 of a voice coil type is provided on the inside of the cylindrical body 11. By the mechanism 103, the lens holder 13 is supported so as to be movable in the vertical direction in the cylindrical body 11. The height of the lens holder 13 is adjusted on the basis of a measurement value at arbitrary time so that the surface of the work W is always positioned in a center portion of the measurement range.

Figure 6:
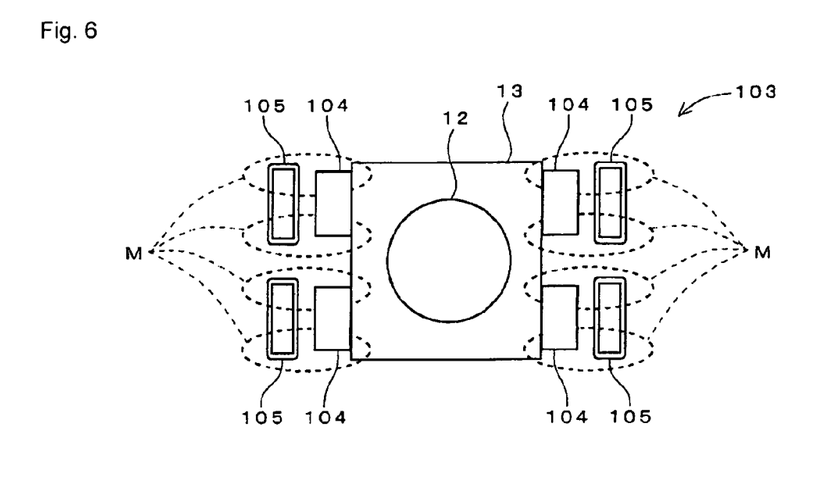
FIG. 6 shows the configuration of a vertically moving mechanism in FIG. 5.

FIG. 6 shows a schematic configuration of the vertical moving mechanism 103.

The vertical moving mechanism 103 is constructed by four focusing magnets 104 provided for the side face of the lens holder 13, and four focus driving coil 105 disposed so as to face the magnets 104. In addition, a current supply circuit for the focusing coil 105 is provided on the inside of the body of the sensor head 1.

In the configuration, the lens holder 13 supporting the objective lens 12 is supported in a predetermined height position by magnetic fields M generated between the focus driving coils 105 and the magnets 104 corresponding to the focus driving coils 105. By controlling the direction and the magnitude of current passed to the focus driving coils 105, the lens holder 13 can be reciprocated along the directions of the optical axis (the directions orthogonal to the drawing sheet of FIG. 6).

In the case of using the sensor head 1 having the configuration shown in FIGS. 5 and 6, each time a detection distance is obtained, the CPU 20 of the controller 2 calculates the difference between the detection distance and a reference detection distance. On the basis of the value of the difference, the direction and amount of the current passed to the focus driving coil 105 are determined. According to the determination, the current supply circuit is controlled. The reference detection distance corresponds to a distance from the center point of the measurement range, that is, the condensing position of the measurement beam BM when the condensing lens is in the reference position to the objective lens 12.

Figure 7:
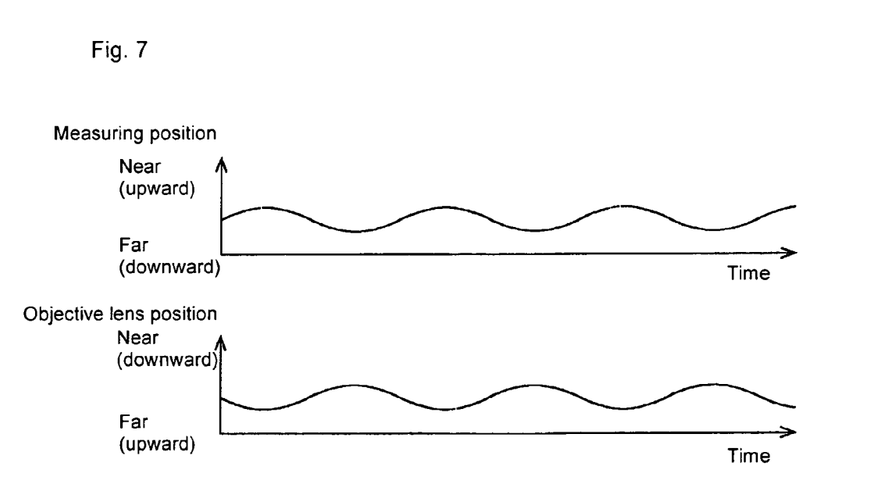
FIG. 7 shows the relation between the position of an object to be measured and an objective lens in adjusting process of a displacement sensor in the configuration of FIG. 5.

By the control, as shown in FIG. 7, when the measurement target position on the work W approaches the objective lens 12, the objective lens 12 moves upward so as to be apart from the work W. When the measurement target position moves away from the objective lens 12, the objective lens 12 moves downward so as to approach the work W.

With the configuration, the surface of the work W is adjusted to be always positioned in the center portion of the measurement range, and measurement can be performed. Consequently, high accuracy measurement can be performed by preventing a displacement part from coming off from the measurement range. By the control, however, even when a displacement to be detected appears, the position of the objective lens 12 is adjusted. It is therefore preferable to perform the position adjustment only when the difference of the detection distance from the reference position is smaller than the threshold for determining the presence/absence of the displacement.

What is claimed is:

1. A displacement sensor comprising:
a projector;
a photoreceiver including an aperture; and
a lens unit including a lens reciprocatable along an optical axis of a coaxial optical system adjusted so that a light emission position of the projector and the aperture have a conjugate relation, the displacement sensor for measuring a displacement of an object to be measured on the basis of the position of the lens when a light reception amount signal of the photoreceiver displays a maximum value,
wherein a light port is formed, in a position opposite to a lens face of a lens at the final stage in the lens unit, in a casing enclosing the coaxial optical system, a lens holder in which an objective lens is supported is detachably disposed in the light port, and
the lens unit converts light from the projector into parallel rays and leads the parallel rays to the objective lens through the light port at a predetermined time point during the reciprocatable lens reciprocates once.

2. The displacement sensor according to claim 1, wherein a position in the optical axis direction of the lens holder or of the objective lens in the holder is changeable.

3. The displacement sensor according to claim 1, wherein the lens unit converts light from the projector to parallel rays when the reciprocatable lens reaches a reference position in which the reciprocatable lens is to be positioned in a stationary state.

4. The displacement sensor according to claim 1, further comprising measuring means for measuring a distance to the object to be measured by using a light reception amount signal obtained by the photoreceiver during travel of the parallel rays or approximately parallel rays from the lens unit.

5. A displacement sensor for measuring a displacement of an object to be measured, comprising:
a projector comprising an aperture;
a photoreceiver;
a lens unit comprising a reciprocatable lens reciprocatable along an optical axis of a coaxial optical system and adjustable so that a light emission position of the projector and the aperture have a conjugate relationship during reciprocation of the reciprocatable lens;
a light port, disposed opposite to a lens face of a lens at a final stage of the lens unit, and disposed in a casing enclosing the coaxial optical system;
a lens holder detachably disposed in the light port, and configured to support an objective lens which is disposed to receive light from the lens unit and to provide a measurement beam to the object to be measured; and
a reciprocatable lens position sensor that measures the position of the reciprocatable lens and provides a lens position signal indicative of the position of the reciprocatable lens,
wherein the lens unit is configured to convert light from the projector into parallel rays and direct the parallel rays to the light port at a predetermined time point during the time the reciprocatable lens reciprocates once; and
wherein the displacement sensor is configured to measure a displacement of the object to be measured on the basis of the measured position of the reciprocatable lens when a light reception amount signal of the photoreceiver displays a maximum value, and a conversion table indicative of the relation between a distance from the objective lens to a condensing position of the measurement beam and the lens position signal.

6. A displacement sensor for measuring a displacement of an object to be measured, comprising:
a projector comprising an aperture;
a photoreceiver;
a lens unit comprising a reciprocatable lens reciprocatable along an optical axis of a coaxial optical system and adjustable so that a light emission position of the projector and the aperture have a conjugate relationship during reciprocation of the reciprocatable lens;

a light port, disposed opposite to a lens face of a lens at a final stage of the lens unit, and disposed in a casing enclosing the coaxial optical system;

a lens holder detachably disposed in the light port, and configured to support an objective lens which is disposed to receive light from the lens unit; and wherein the lens unit is configured to convert light from the projector into parallel rays and direct the parallel rays to the light port at a predetermined time point during the time the reciprocatable lens reciprocates once, and wherein the displacement sensor is configured to measure a displacement of the object to be measured on the basis of the measured position of the reciprocatable lens when a light reception amount signal of the photoreceiver displays a maximum value, wherein the lens unit comprises a condenser lens arranged to receive light from the projection and a collimating lens following the condenser lens, wherein both the condenser lens and the collimating lens are configured to be reciprocatable along the optical axis of the coaxial optical system.

7. The displacement sensor according to claim 5, wherein the reciprocatable lens position sensor comprises a photodiode.

8. The displacement sensor according to claim 2, further comprising a cylindrical body communicated with the light port and an adjustment screw arranged to adjust the position in the optical axis direction of the lens holder.

9. The displacement sensor according to claim 2, further comprising a cylindrical body communicated with the light port and a moving mechanism
arranged to adjust the position in the optical axis direction of the lens holder.

* * * * *